UNITED STATES PATENT OFFICE.

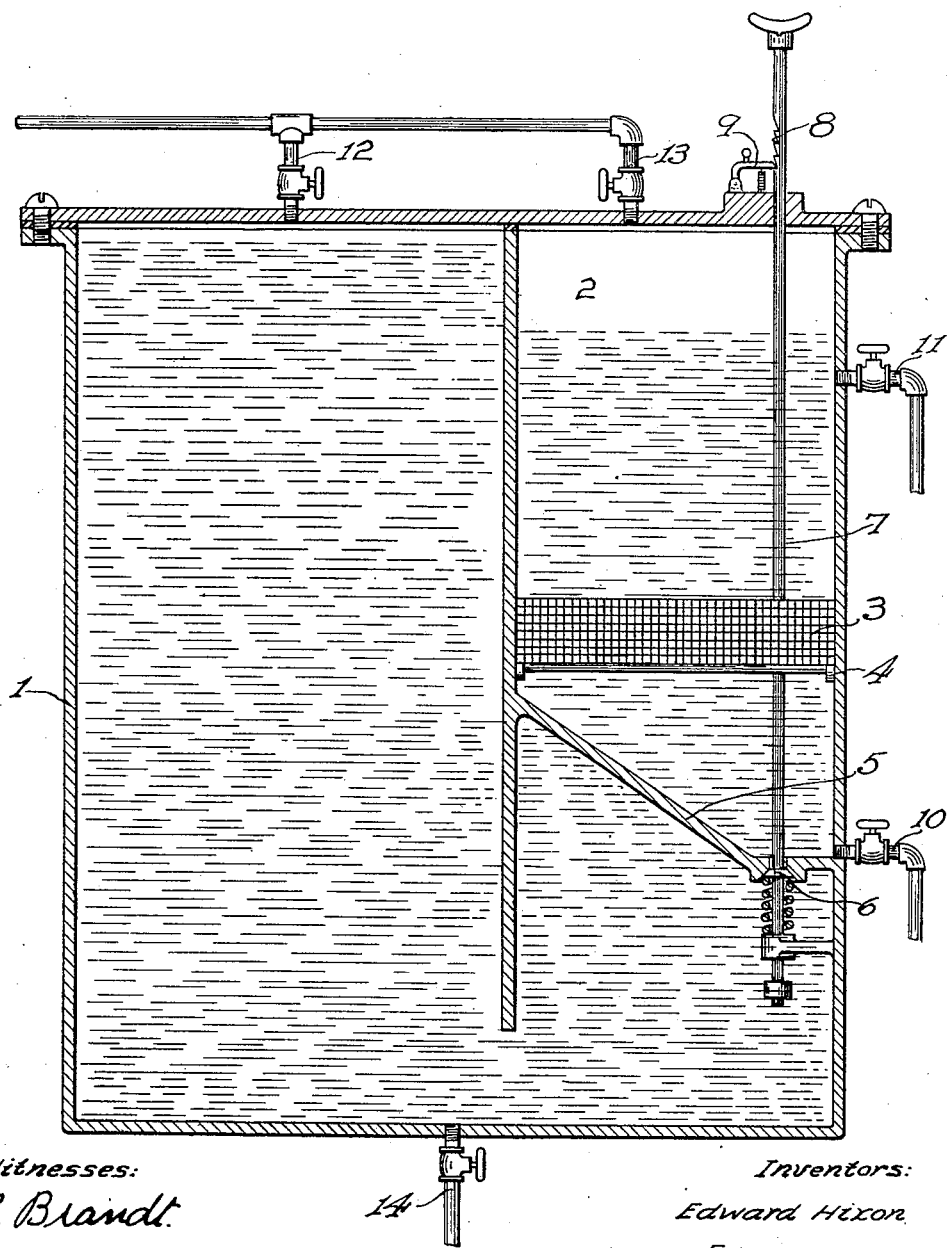

EDWARD HIXON AND EDWY S. PARKER, OF CHICAGO, ILLINOIS.

FILTER.

1,042,793.  Specification of Letters Patent.  Patented Oct. 29, 1912.

Application filed April 19, 1912. Serial No. 691,782.

*To all whom it may concern:*

Be it known that we, EDWARD HIXON and EDWY S. PARKER, citizens of the United States, and residents of the city of Chicago, county of Cook, and State of Illinois, have invented certain new and useful Improvements in Filters, of which the following is a specification.

Our invention relates to improvements in filters and has for its object the provision of a filter of this character which is simple of construction and efficient in operation.

The invention consists in the combinations and arrangements of parts hereinafter described and claimed.

The invention will be best understood by reference to the accompanying drawing forming a part of this specification and which is a vertical section of an apparatus embodying our invention.

The preferred form of construction, as illustrated in the drawing comprises a suitable tank 1 having a compartment 2 arranged at one side thereof. A filtering barrier 3 is arranged in compartment 2, as shown, said filtering barrier preferably consisting of one or more wire mesh baskets filled with charcoal and supported by means of ledges or shoulders 4 arranged in said compartment. The compartment 2 is provided with an outwardly sloping bottom 5 and a valve 6 is arranged in the bottom of said compartment to permit communication between the bottom of said compartment and the lower portion of said tank. Valve 6 is governed by a push rod 7 which extends upwardly through barrier 3 and the top of tank 1, as indicated. Push rod 7 is provided with a series of ratchet teeth 8 coöperating with the spring held latching device 9 which serves to lock said push rod in adjusted positions. A valved discharge pipe 10 leads from compartment 2 below barrier 3 and a similar valved discharge pipe 11 leads from said compartment above said barrier. Valved supply pipes 12 and 13 lead into the upper portions of tank 1 and compartment 2, respectively and serve to supply water thereto.

In operation the water to be filtered is supplied to tank 1 through supply pipe 12, supply pipe 13 being closed; discharge pipe 10 is closed and discharge pipe 11 opened so as to permit the flow of water therethrough. Push rod 7 is depressed to open valve 6 to permit the flow of water upwardly through compartment 2. The water thus flowing through compartment 2 will be filtered by barrier 3 and pass out through discharge pipe 11. When it is desired to cleanse the filtering barrier, supply pipe 12 is closed, discharge pipe 10 is opened, discharge pipe 11 is closed, supply pipe 13 is opened and valve 6 is closed. This will cause the flow of water downwardly through compartment 2 and barrier 3 to cleanse said barrier, and this cleansing water will be discharged through pipe 10 without contaminating the water in the tank. The outwardly sloping bottom of compartment 2 tends to direct the solid matter toward discharge pipe 10 and thus facilitate the cleansing. When the barrier has thus been thoroughly cleansed, pipe 10 is closed, pipe 11 opened, pipe 13 closed, pipe 12 opened and valve 6 opened, when the filtering process will be resumed. A suitable valve discharge pipe 14 is provided for tank 1 so that the same may be cleansed when desired.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. The combination with a tank, of a filtering compartment, having its lower end communicating with the lower portion of said tank; a filtering barrier arranged in said compartment; a valve controlling communication between the lower portion of said compartment and said tank; discharges for said compartment arranged above and below said barrier; a valve in the discharge below said barrier and means for supplying liquid to the upper portions of said tank and said compartment, substantially as described.

2. The combination with a tank, of a filtering compartment having its lower end communicating with the lower portion of said tank; a filtering barrier arranged in said compartment; a valve controlling the communication between the lower portion of said compartment and said tank; valved discharges for said compartment arranged above and below said barrier; and means for supplying liquid to the upper portions of said tank and said compartment, substantially as described.

3. The combination with a tank, of a filtering compartment having its lower end communicating with the lower portion of said tank; a filtering barrier arranged in said compartment; a valve controlling the communication between the lower portion of said compartment and said tank; valved discharges for said compartment arranged above and below said barrier; and means for supplying liquid to the upper portions of said tank and said compartment, the bottom of said compartment being sloped toward said lower discharge, substantially as described.

4. The combination with a tank, of a filtering compartment having its lower end communicating with the lower portion of said tank; a filtering barrier arranged in said compartment; a valve controlling the communication between the lower portion of said compartment and said tank; a push rod controlling said valve; a latching mechanism for locking said push rod in adjusted positions; valved discharges for said compartment arranged above and below said barrier; and means for supplying liquid to the upper portions of said tank and said compartment, substantially as described.

5. The combination with a tank, of a filtering compartment having its lower end communicating with the lower portion of said tank; a filtering barrier arranged in said compartment; a valve controlling the communication between the lower portion of said compartment and said tank; a push rod controlling said valve; a latching mechanism for locking said push rod in adjusted positions; valved discharges for said compartment arranged above and below said barrier; and means for supplying liquid to the upper portions of said tank and said compartment, the bottom of said compartment being sloped toward said lower discharge, substantially as described.

In testimony whereof we have signed our names to this specification in the presence of two subscribing witnesses.

EDWARD HIXON.
EDWY S. PARKER.

Witnesses:
ARTHUR A. OLSON,
JOSHUA R. H. POTTS.

---

Copies of this patent may be obtained for five cents each, by addressing the "Commissioner of Patents, Washington, D. C."